J. A. FRAUENHEIM.
STAY BOLT.
APPLICATION FILED NOV. 13, 1915.

1,207,391. Patented Dec. 5, 1916.

WITNESSES
Jesse B. Heller
R. H. Balderson

INVENTOR
J. A. Frauenheim
by Bakewell, Byrnes & Parmelee
attys.

UNITED STATES PATENT OFFICE.

JOSEPH A. FRAUENHEIM, OF ZELIENOPLE, PENNSYLVANIA.

STAY-BOLT.

1,207,391.  Specification of Letters Patent.  Patented Dec. 5, 1916.

Application filed November 13, 1915. Serial No. 61,277.

*To all whom it may concern:*

Be it known that I, JOSEPH A. FRAUENHEIM, a citizen of the United States, and a resident of Zelienople, in the county of Butler and State of Pennsylvania, have invented a new and useful Improvement in Stay-Bolts, of which the following is a full, clear, and exact description, reference being had to the accompanying drawings, forming part of this specification, in which—

Figure 1:
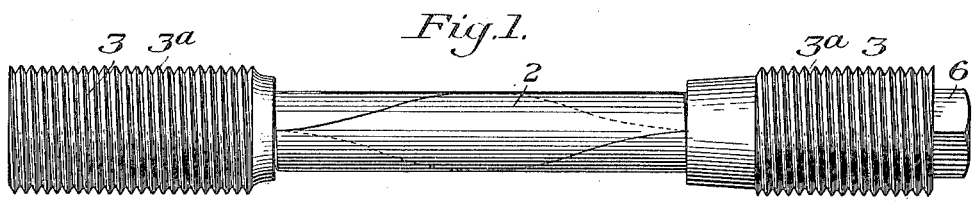
Figure 2:
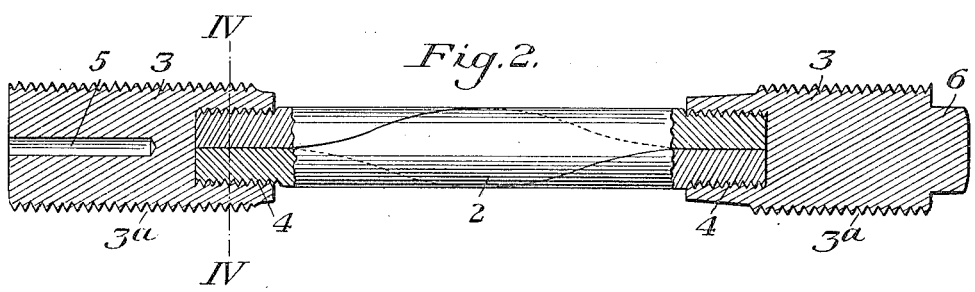
Figure 3:
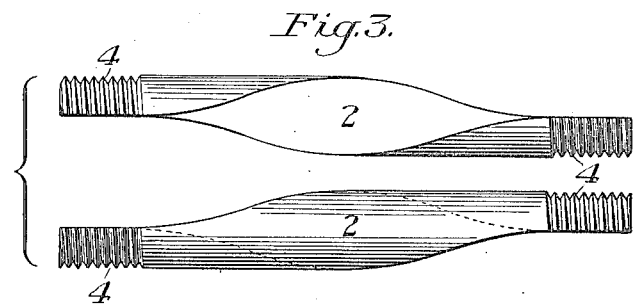
Figure 4:
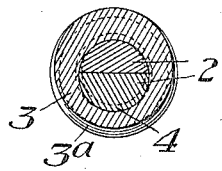

Figure 1 is a side elevation of one form of bolt having enlarged screw threaded heads. Fig. 2 is a similar view partially in section. Fig. 3 is a side elevation of the two body members of the bolt showing them separated; and Fig. 4 is a transverse sectional view on the line IV—IV.

This invention relates to an improvement in stay bolts, and is designed to provide a bolt having a plurality of similar body members which are twisted about the longitudinal axis thereof, and a plurality of heads connected thereto, which can be cheaply made and readily assembled.

Another object of my invention is to provide a flexible bolt of this character, which can be made without forging any portion thereof, so that the initial scale on the body of the bolt will not be destroyed.

The precise nature of my invention will be best understood by reference to the accompanying drawings, which will now be described, it being premised, however, that various changes may be made in the details of construction and arrangement of the parts without departing from the spirit and scope of my invention, as defined in the appended claims.

In the drawings, the reference character 2 designates the body members of the bolt, which are duplicates of each other, and which are provided with threaded ends 4—4. These members are made from the rolled stock and are twisted about the longitudinal axis, so that the initial rolled scale will extend in a helical manner throughout the bolt. Secured to the end of the body members are the internally threaded heads 3 which are also threaded at 3ª, on the periphery thereof, for connecting to the boiler sheets. One of the head members is provided with a tell-tale hole 5, while the other member is provided with a wrench seat 6.

The body members 2 may be made by any of the well known processes, but it is essential that these members be twisted about the longitudinal axis of the bolt, so as to provide a bolt having a flexible body portion between the heads to compensate for the movement of the boiler sheets.

The advantages of my invention result from the provision of a bolt having a plurality of twisted body portions and heads of larger diameter, which can be formed without upsetting or forging any portion of the bolt to destroy the initial rolled skin portion of the metal.

I claim:

1. A bolt having a body formed of two members twisted about the longitudinal axis of the bolt and a head removably connected to one end of the body members, the other end of said body members being provided with screw threads; substantially as described.

2. A stay bolt having a body portion formed of two members twisted about the longitudinal axis of the bolt, a head connected to each end of the body members by screw threaded connections, said heads having screw threads on the periphery thereof; substantially as described.

3. A stay bolt having a body member and externally threaded heads of larger diameter connected to the ends of the body, said body portion being formed of a plurality of semicylindrical members twisted about the longitudinal axis of the bolt, and having screw threaded connections with the heads; substantially as described.

In testimony whereof I have hereunto set my hand.

JOSEPH A. FRAUENHEIM.

Witnesses:
 GEO. B. BLEMING,
 JESSE B. HELLER.